(12) United States Patent
Yamanaka

(10) Patent No.: US 10,960,919 B2
(45) Date of Patent: Mar. 30, 2021

(54) CONTROL DEVICE AND ELECTRIC POWER STEERING DEVICE USING SAME

(71) Applicant: DENSO CORPORATION, Kariya (JP)

(72) Inventor: Takahiro Yamanaka, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/542,038

(22) Filed: Aug. 15, 2019

(65) Prior Publication Data

US 2019/0367080 A1 Dec. 5, 2019

Related U.S. Application Data

(63) Continuation of application No. PCT/JP2018/005403, filed on Feb. 16, 2018.

(30) Foreign Application Priority Data

Feb. 21, 2017 (JP) .............................. JP2017-029883

(51) Int. Cl.
B62D 5/04 (2006.01)

(52) U.S. Cl.
CPC ......... B62D 5/0463 (2013.01); B62D 5/0481 (2013.01)

(58) Field of Classification Search
CPC ........... H02P 6/24; H02P 6/00; B62D 5/0463; B62D 5/0481
See application file for complete search history.

(56) References Cited

U.S. PATENT DOCUMENTS

| | | | | |
|---|---|---|---|---|
| 6,885,225 | B2* | 4/2005 | Ohmichi | H02M 7/538 327/108 |
| 8,169,174 | B2* | 5/2012 | Shibata | B62D 5/0487 318/434 |
| 8,698,435 | B2* | 4/2014 | Tada | B62D 5/0487 318/400.21 |
| 2003/0156439 | A1 | 8/2003 | Ohmichi et al. | |
| 2005/0258792 | A1 | 11/2005 | Matsuda et al. | |
| 2006/0267671 | A1 | 11/2006 | Khan et al. | |
| 2008/0217095 | A1* | 9/2008 | Ono | B62D 5/0457 180/443 |
| 2011/0115289 | A1 | 5/2011 | Kitamoto | |
| 2011/0231064 | A1 | 9/2011 | Abe et al. | |

(Continued)

FOREIGN PATENT DOCUMENTS

JP H11-020718 A 1/1999
JP 2003-244966 A 8/2003

(Continued)

*Primary Examiner* — Rina I Duda
(74) *Attorney, Agent, or Firm* — Maschoff Brennan

(57) ABSTRACT

A control device includes an inverter, a first drive unit, a first booster, a second drive unit, and a second booster. The inverter has a plurality of high potential switching elements and a plurality of low potential switching elements, and supplies electric power from a power supply to the motor. The first drive unit controls an operation of the high potential switching elements. The first booster is connected to the first drive unit, boosts the voltage of the power supply, and outputs the boosted voltage to the first drive unit. The second drive unit controls an operation of the low potential switching elements. The second booster is connected to the second drive unit, boosts the voltage of the power supply, and outputs the other boosted voltage to the second drive unit.

9 Claims, 6 Drawing Sheets

(56) References Cited

U.S. PATENT DOCUMENTS

| | | | |
|---|---|---|---|
| 2012/0074886 A1 | 3/2012 | Miyazaki | |
| 2013/0257328 A1* | 10/2013 | Arai | H02P 29/028 318/400.22 |
| 2014/0222294 A1* | 8/2014 | Sugiyama | H02M 3/1582 701/42 |
| 2015/0084570 A1* | 3/2015 | Hara | H02P 21/22 318/494 |

FOREIGN PATENT DOCUMENTS

| | | |
|---|---|---|
| JP | 2004-129378 A | 4/2004 |
| JP | 2005-006467 A | 1/2005 |
| JP | 2006-333561 A | 12/2006 |
| JP | 2006-333694 A | 12/2006 |
| JP | 2011-019779 A | 2/2011 |
| JP | 2011-200037 A | 10/2011 |
| JP | 2013-163515 A | 8/2013 |
| JP | 2016-101922 A | 6/2016 |

* cited by examiner

CONTROL DEVICE AND ELECTRIC POWER STEERING DEVICE USING SAME

CROSS REFERENCE TO RELATED APPLICATION

The present application is a continuation application of International Patent Application No. PCT/JP2018/005403 filed on Feb. 16, 2018, which designated the U.S. and claims the benefit of priority from Japanese Patent Application No. 2017-29883 filed on Feb. 21, 2017. The entire disclosures of all of the above applications are incorporated herein by reference.

TECHNICAL FIELD

The present disclosure relates to a control device and an electric power steering device using the same.

BACKGROUND

Conventionally, an electric power steering device is known such that a boost power source is connected to a drive circuit. In the configuration, a boost power source is used to drive the switching element on the high voltage side. The voltage of the power supply is used to drive the switching element on the low voltage side.

SUMMARY

According to an example embodiment a control device includes an inverter, a first drive unit, a first booster, a second drive unit, and a second booster. The inverter has a plurality of high potential switching elements and a plurality of low potential switching elements, and supplies electric power from a power supply to the motor. The first drive unit controls an operation of the high potential switching elements. The first booster is connected to the first drive unit, boosts the voltage of the power supply, and outputs the boosted voltage to the first drive unit. The second drive unit controls an operation of the low potential switching elements. The second booster is connected to the second drive unit, boosts the voltage of the power supply, and outputs the other boosted voltage to the second drive unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
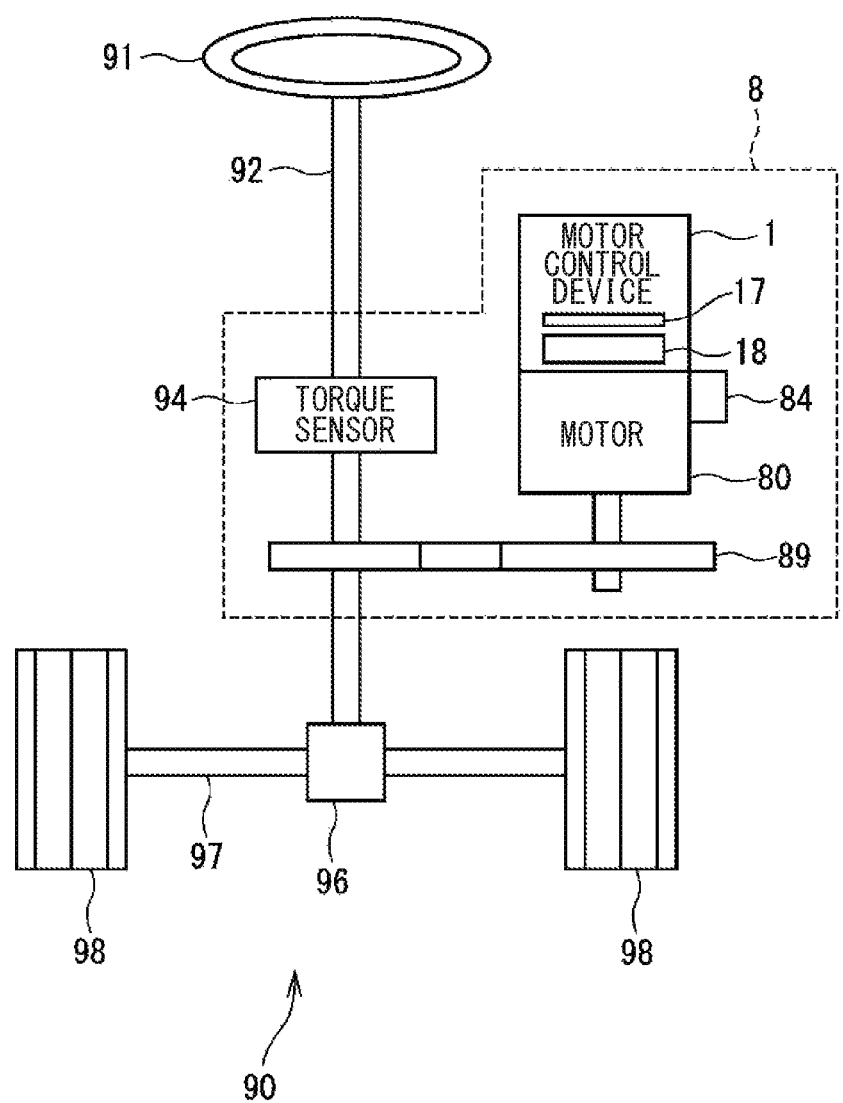
FIG. 1 is a schematic structural diagram illustrating a steering system according to an example embodiment.

Here, in recent years, a low voltage drive is required in the electric power steering device. When driving at low voltage, the voltage between the gate and the source on the low voltage side may not be ensured, and the switching element may be in the half-on state. For this reason, the on-state resistance as a resistance value when the switching element is in the on state rapidly increases. As the on-state resistance increases, the power loss increases. For this reason, the temperature of the switching element may rise due to heat generation by the power loss, and the switching element may be damaged such as burnout.

A control device and an electric power steering device are provided with avoiding a failure of a switching element even if the power supply voltage is lowered.

The control device of an example embodiment controls a motor that is rotated by electric power.

The control device includes an inverter, a first drive unit, a first booster, a second drive unit, and a second booster.

The inverter has a plurality of high potential switching elements and a plurality of low potential switching elements, and supplies electric power from the power supply to the motor.

The high potential switching element is connected to the high potential line.

The low potential switching element is connected to the low potential line.

The first drive unit can control the operation of the high potential switching element.

The first booster is connected to the first drive unit, boosts the voltage of the power supply, and outputs the boosted voltage to the first drive unit.

The second drive unit can control the operation of the low potential switching element.

The second booster is connected to the second drive unit, boosts the voltage of the power supply, and outputs the boosted voltage to the second drive unit.

Since the voltage boosted by the second booster is supplied to the second drive unit, the low potential switching element is never in the half-on state even when the power supply voltage Vb becomes low. As a result, the on-state resistance is prevented from rapidly increasing, and the power loss is reduced. As a result, it is possible to avoid a failure such as burnout of the switching element.

Further, an example embodiment is provided as a motor that outputs an assist torque for assisting a driver's steering operation and an electric power steering device using the control device.

The electric power steering device exhibits similar effects as the control device.

Hereinafter, a control device according to an embodiment and an electric power steering device using the same will be described with reference to the drawings. In a plurality of embodiments below, a substantially identical element is designated by the same reference numeral to eliminate duplicated description. When referred to as the present embodiment, a plurality of embodiments may be included.

Here, an electric power steering device using a motor control device 1 as a control device of the present embodiment will be described with reference to the drawings.

As shown in FIG. 1, the electric power steering device 8 is used for a steering system 90.

The steering system 90 is mounted on a vehicle, and includes a steering wheel 91, a steering shaft 92, a torque sensor 94, a pinion gear 96, a rack shaft 97, wheels 98 and an electric power steering device 8.

The steering wheel 91 is a steering member and is connected to the steering shaft 92. The torque input by an operation of a driver through the steering wheel 91 is defined as the steering torque.

In the steering shaft 92, a pinion gear 96 is provided at the tip.

The torque sensor 94 can detect a steering torque. The detected steering torque is output to the control unit 30 of the motor control device 1.

The pinion gear 96 engages with the rack shaft 97.

The rack shaft 97 has a pair of wheels 98 connected to both ends of the rack shaft 97 via a die rod or the like.

The electric power steering device 8 includes a reduction gear 89, a motor 80 as a rotating electric machine, a rotation angle sensor 84, and the motor control device 1.

The electric power steering device 8 of the present embodiment is a so-called "column assist type" device. Alternatively, the electric power steering device 8 may be a so-called "rack assist type" device which transmits the rotation of the motor 80 to the rack shaft 97.

The reduction gear 89 reduces the rotation of the motor 80 and transmits it to the steering shaft 92.

A torque that assists the driver in steering operation of the steering wheel 91 is referred to as an assist torque.

The motor 80 outputs an auxiliary torque. Electric power is supplied to the motor 80 from the battery 5 as a "power supply", and the motor 80 is driven. The motor 80 causes the reduction gear 89 to rotate in the forward and reverse directions.

The rotation angle sensor 84 is, for example, a resolver, and can detect the electric angle θ of the motor 80. The detected electric angle θ is output to the control unit 30.

The rotation angle sensor 84 can calculate the rotation angular velocity ω of the motor 80 based on the electric angle θ.

Embodiments

Figure 2:
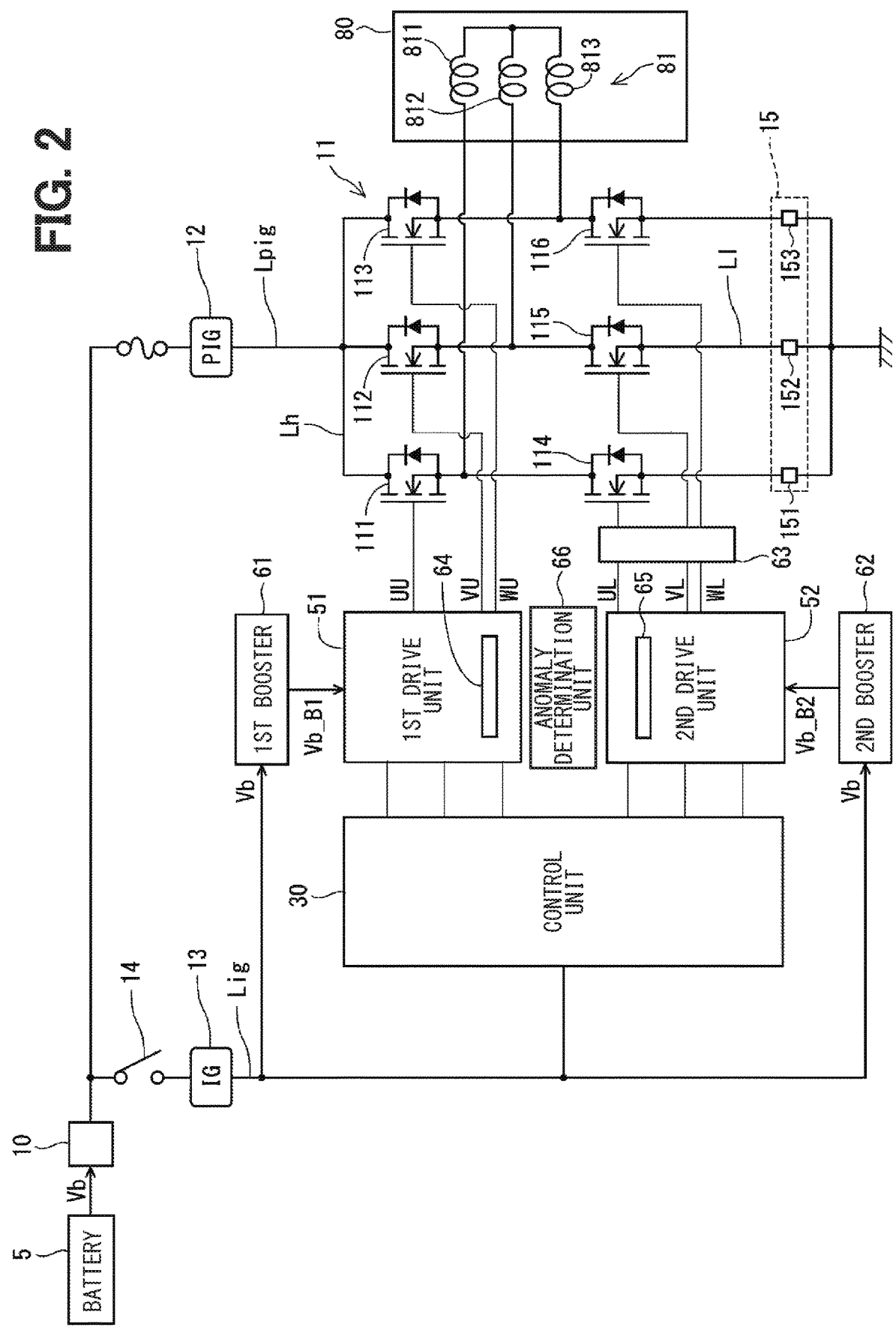
FIG. 2 is a circuit diagram illustrating a motor control device according to an example embodiment.

As shown in FIG. 2, the motor 80 is a three-phase AC motor and is a brushless motor.

The motor 80 has a winding set 81.

The winding set 81 has a U-phase coil 811, a V-phase coil 812, and a W-phase coil 813. One end of the coils 811, 812, 813 is connected to the inverter 11, and the other end is connected to each other.

The motor control device 1 is connected to the battery 5 via the power supply terminal 12 and the ignition terminal 13 respectively.

The power supply terminal 12 is connected to the high potential side of the battery 5.

The ignition terminal 13 is connected to the high potential side of the battery 5 via the ignition switch 14.

The motor control device 1 includes a power supply voltage detection unit 10, an inverter 11, a motor current detection unit 15, a substrate 17, and a heat sink 18.

Further, the motor control device 1 includes a control unit 30, a first drive unit 51, a second drive unit 52, a first booster 61, a second booster 62, a gate voltage detection unit 63, a first drive current detection unit 64, a second drive current detection unit 65 and an anomaly determination unit 66.

The power supply voltage detection unit 10 is connected to the battery 5 and can detect the power supply voltage Vb.

The power supply voltage detection unit 10 outputs the detected power supply voltage Vb to the first booster 61 and the second booster 62.

The inverter 11 is provided to correspond to the winding set 81, and is a three-phase inverter.

The inverter 11 is connected to the PIG power supply line Lpig from the battery 5 via the power supply terminal 12.

The inverter 11 has a plurality of high potential switching elements 111-113 and a plurality of low potential switching elements 114-116.

The high potential switching elements 111 to 113 are connected to the high potential line Lh.

The low potential switching elements 114 to 116 are connected to the low potential line Ll.

The switching elements 111 to 116 are MOSFETs. The switching elements 111 to 116 may be IGBTs.

The connection point between the U-phase switching elements 111 and 114 as a pair is connected to the first U-phase coil 811.

A connection point of the V-phase switching elements 112 and 115 as a pair is connected to a first V-phase coil 812.

A connection point of the W-phase switching elements 113 and 116 as a pair is connected to a first W-phase coil 813.

The motor current detection unit 15 includes motor current detection elements 151-153.

The motor current detection elements 151-153 are, for example, shunt resistors or Hall elements.

The motor current detection element 151 is arranged between the low potential switching element 114 and the ground line Lg1, and detects the U-phase current Iu flowing through the U-phase coil 811.

The motor current detection element 152 is arranged between the low potential switching element 115 and the ground line Lg1 and detects a V-phase current Iv flowing through the V-phase coil 812.

The motor current detection element 153 is arranged between the low potential switching element 116 and the ground line Lg1 and detects a W-phase current Iw flowing through the E-phase coil 813.

The substrate 17 mounts each part of the motor control device 1.

The heat sink 18 has a plurality of fins, which are heat sink plates, and can discharge the heat of the switching elements 111-116 and 121-126.

The control unit 30 mainly includes a microcomputer and the like. Each process in the control unit 30 may be a software process in the CPU by executing a program pre-stored in a tangible memory device like the ROM, or a hardware process performed by a dedicated electronic circuit.

The control unit 30 is connected to the ignition line Lig.

The control unit 30 controls the motor 80 by current feedback control based on the steering torque, the electric angle θ, and the phase currents Iu, Iv, Iw.

Figure 3:
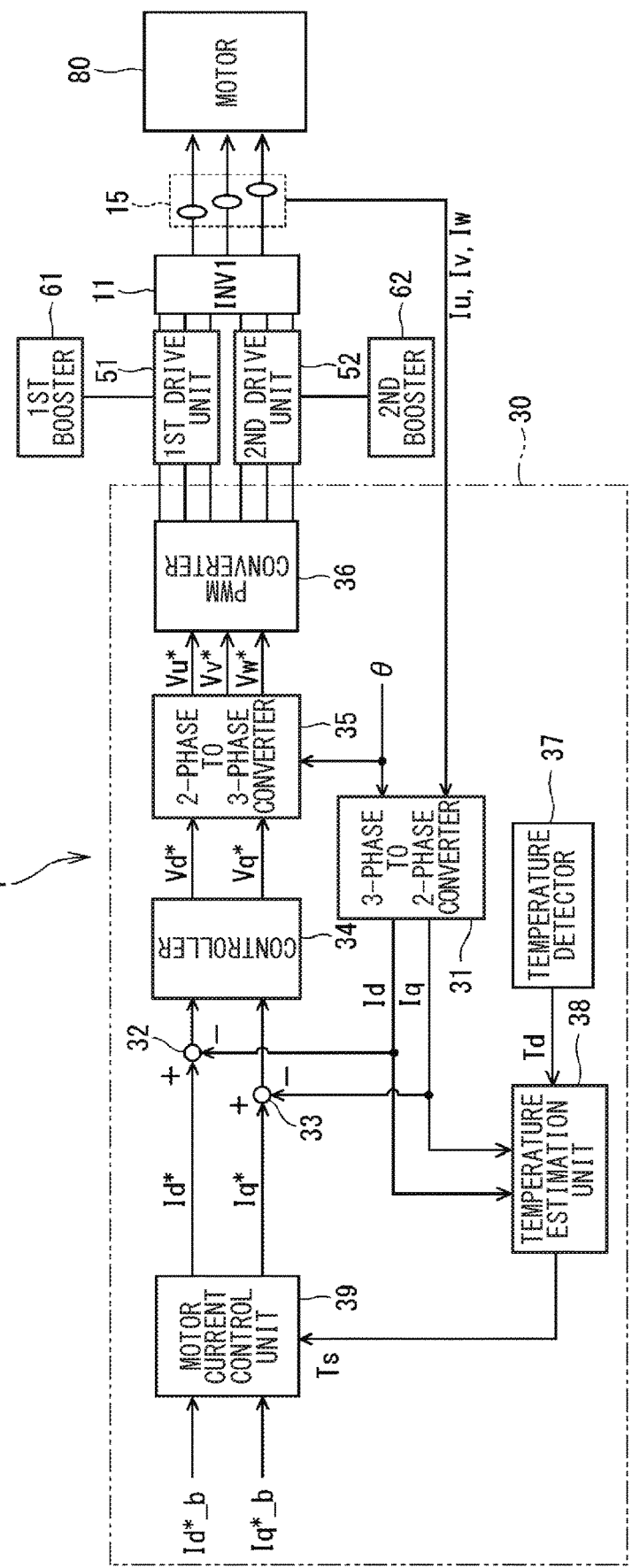
FIG. 3 is a block diagram showing a control unit of a motor control device according to an example embodiment.

As shown in FIG. 3, the control unit 30 includes a three-phase/two-phase converter 31, a temperature detector 37, a temperature estimation unit 38, a motor current limiting unit 39, subtractors 32 and 33, a controller 34, and a two-phase to three-phase converter 35 and a PWM converter 36.

The three-phase/two-phase converter 31 performs dq conversion on the phase currents Iu, Iv, and Iw based on the electric angle θ.

Further, the three-phase/two-phase converter 31 calculates the d-axis current detection value Id and the q-axis current detection value Iq.

The temperature detector 37 is, for example, a thermistor which is a ceramic semiconductor whose electric resistance changes in accordance with the temperature. The temperature of the substrate 17 is defined as a substrate temperature Tb. The substrate temperature Tb also includes the atmosphere temperature around the substrate 17. The temperature of the heat sink 18 is defined as the heat sink temperature Th. The atmosphere temperature outside the motor control device 1 is defined as the outside air temperature Ta.

The temperature detector 37 can detect the substrate temperature Tb, the heat sink temperature Th or the outside air temperature Ta. The temperature detected by the temperature detector 35 is referred to as a detection temperature Td.

The temperature detector 37 outputs the detection temperature Td to the temperature estimation unit 38.

The temperature estimation unit 38 can estimate the element temperature Ts based on the dq axis current detection values Id and Iq and the detection temperature Td.

The temperature estimation unit 38 calculates the temperature change amount of the high potential switching elements 111 to 113 and the low potential switching elements 114 to 116 from the dq axis current detection values Id and Iq.

The temperature estimation unit 38 estimates the element temperature Ts by adding the detection temperature Td to the temperature change amount of the high potential switching elements 111-113 and the low potential switching elements 114-116.

The motor current limitation unit 39 limits the dq-axis current command values Id* and Iq* based on the element temperature Ts. The limit value of the d-axis current detection value Id is set as the d-axis limit current Id_lim. The limit value of the q-axis current detection value Iq is set as the q-axis limit current Iq_lim. The d- and q-axis limit currents Id_lim and Iq_lim are set to decrease linearly as the element temperature Ts increases.

The current command values before being limited are set as before-limit dq axis current command values Id*_b and Iq*_b.

The motor current limitation unit 39 sets the d-axis current command value Id* as the d-axis limit current Id_lim when the before-limit d-axis current command value Id*_b is larger than the d-axis limit current Id_lim.

When the before-limit q-axis current command value Iq*_b is larger than the q-axis limit current Iq_lim, the motor current limitation unit 39 sets the q-axis current command value Iq* as the q-axis limit current Iq_lim.

The subtractor 32 calculates a deviation ΔId between the d-axis current command value Id* and the d-axis current detection value Id.

The subtractor 33 calculates a deviation ΔIq between the q-axis current command value Iq* and the q-axis current detection value Iq.

The controller 34 calculates the d-axis voltage command value Vd* and the q-axis voltage command value Vq* by PI calculation or the like so that the deviations ΔId and ΔIq converge to zero.

The two-phase/three-phase converter 35 performs an inverse dq-conversion of the d-axis voltage command value Vd* and the q-axis voltage command value Vq* based on the electric angle θ.

Further, the two-phase/three-phase converter 35 calculates voltage command values Vu*, Vv* and Vw* in three phases.

The PWM converter 36 calculates voltages to be applied to the high potential switching elements 111 to 113 based on the three-phase voltage command values Vu*, Vv*, Vw*, and generates the first drive signals UU, VU, WU.

The PWM converter 36 outputs the first drive signals UU, VU, WU to the first drive unit 51.

Further, the PWM converter 36 calculates voltages to be applied to the low potential switching elements 114-116 based on the three-phase voltage command values Vu*, Vv* and Vw*, and generates second drive signals UL, VL and WL.

The PWM converter 36 outputs the second drive signals UL, VL, and WL to the second drive unit 52.

The inverter 11 is controlled to turn on and off based on the first drive signals UU, VU, WU and the second drive signals UL, VL, WL.

The first drive unit 51 can control the operation of the high potential switching elements 111 to 113 based on the first drive signals UU, VU, and WU.

The second drive unit 52 can control the operation of the low potential switching elements 114 to 116 based on the second drive signals UL, VL, and WL.

The first booster 61 and the second booster 62 are integrally provided on the substrate 17. A microcomputer or the like may be mounted in the first booster 61 and the second booster 62.

The first booster 61 is connected to the battery 5 and the first drive unit 51, and boosts the power supply voltage Vb. The voltage boosted by the first booster 61 is referred to as a first boosted voltage Vb_B1.

The first booster 61 outputs the first boosted voltage Vb_B1 to the first drive unit 51.

Figure 4:
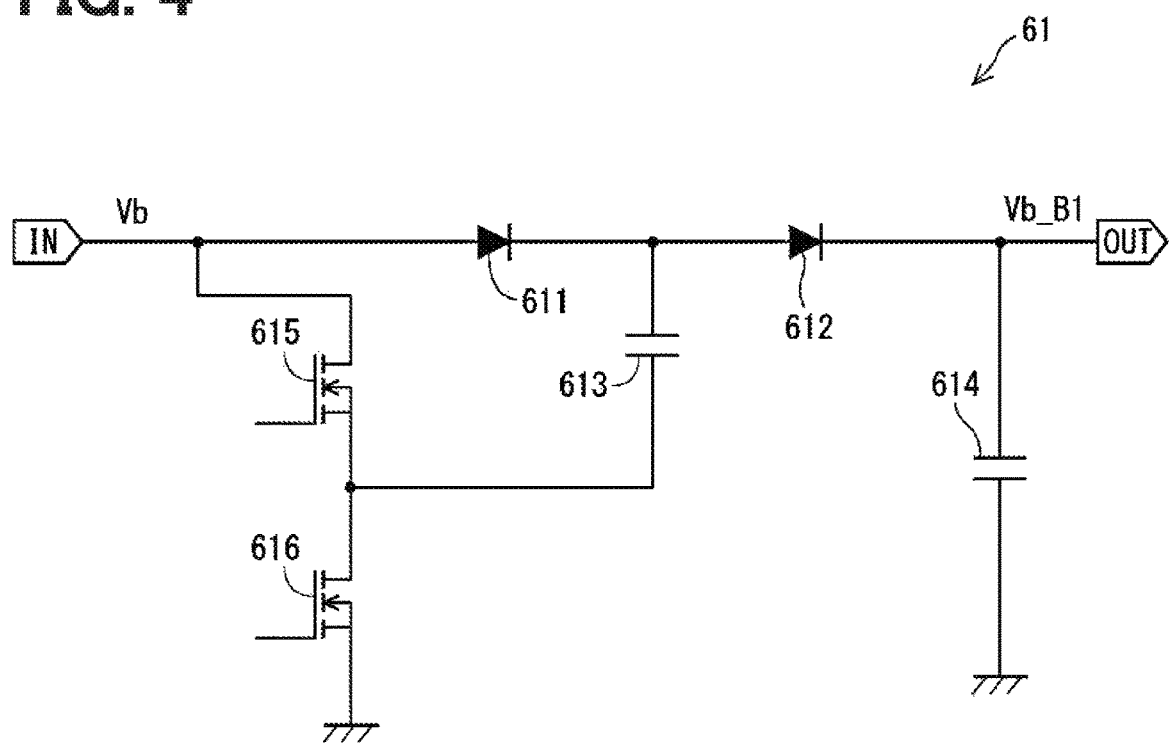
FIG. 4 is a circuit diagram for explaining a first booster of the motor control device according to an example embodiment.

As shown in FIG. 4, the first booster 61 includes diodes 611 and 612, capacitors 613 and 614, and switching elements 615 and 616.

The capacitor 614 is provided closer to the output side than the capacitor 613.

The voltage related to the capacitor 613 is defined as Vc. For example, when the switching element 615 turns off and the switching element 616 turns on, the voltage Vc is charged to the capacitor 613 by the power supply voltage Vb. The voltage Vc is expressed as the following equation (1). Here, a voltage Vf is a voltage related to a forward direction of each of the diodes 611 and 612.

$$Vc = Vb - Vf \tag{1}$$

After the capacitor 613 is charged, when the switching element 615 turns on and the switching element 616 turns off, the first boosted voltage Vb_B1 is expressed by the following equation (2).

$$Vb\_B1 = Vb + Vc - Vf = 2Vb - 2Vf \tag{2}$$

The first boosted voltage Vb_B1 is used to charge the gates of the high potential switching elements 111-113. An amount of necessary gate charge for turning on the high potential switching elements 111 to 113 is defined as Qg1. The charge amount of the capacitor 414 is defined as Q1.

The amounts Qg1 and Q1 are set so as to satisfy the following equation (3). Here, n is the number of high potential switching elements 111-113. In the present embodiment, n=3. The capacitor 613 is set to charge capacitor 614.

$$Qg1 \times n < Q1 \tag{3}$$

The second booster 62 is connected to the battery 5 and the second drive unit 52, and boosts the power supply voltage Vb. The second booster 62 is set to boost the power supply voltage Vb when the power supply voltage Vb is smaller than the power supply voltage threshold Vb_th. The power supply voltage threshold Vb_th is set in advance, and is set by an experiment, a simulation or the like. The voltage boosted by the second booster 62 is referred to as a second boosted voltage Vb_B2.

Further, the first boosted voltage Vb_B1 is set to be larger than the second boosted voltage Vb_B2, that is, to have a relationship of the equation (4).

$$Vb\_B1 > Vb\_B2 \qquad (4)$$

The second booster 62 outputs the second boosted voltage Vb_B2 to the second drive unit 52.

Figure 5:
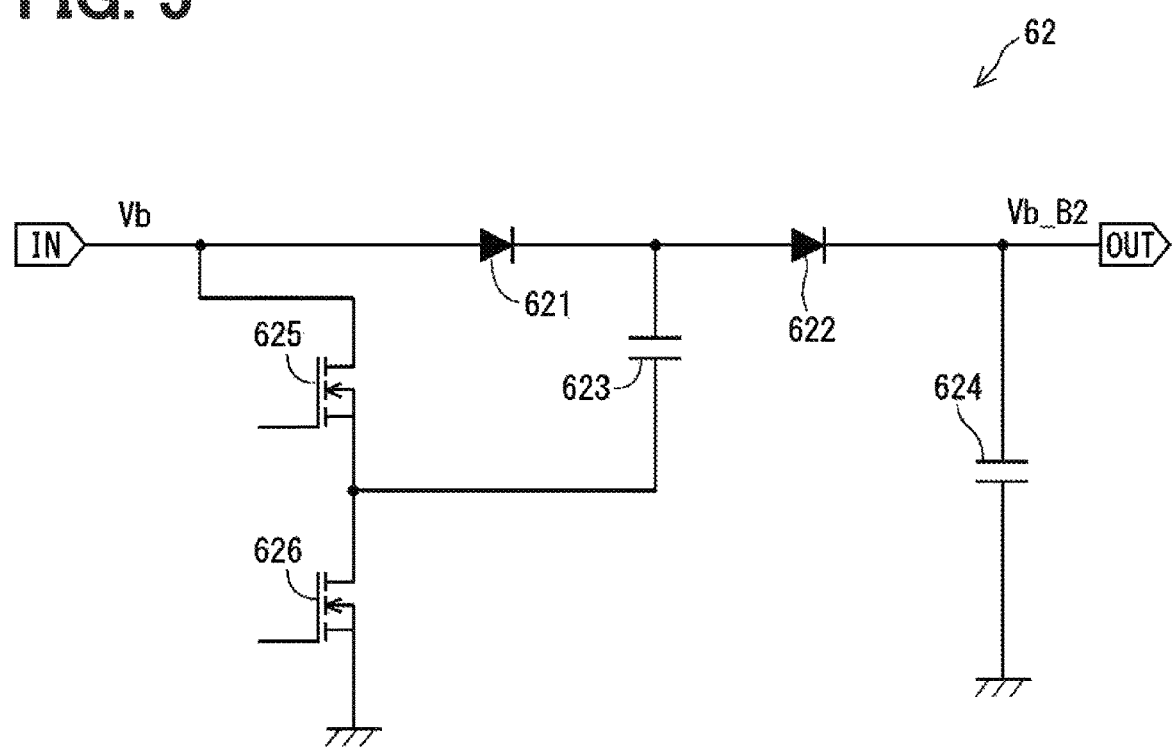
FIG. 5 is a circuit diagram for explaining a second booster of the motor control device according to an example embodiment.

As shown in FIG. 5, the second booster 62 includes diodes 621 and 622, capacitors 623 and 624, and switching elements 625 and 626.

Similar to the first booster 61, the second booster 62 boosts the power supply voltage Vb.

The second boosted voltage Vb_B2 is used to charge the gates of the low potential switching elements 114-116. An amount of necessary gate charge for turning on the low potential switching elements 114 to 116 is defined as Qg2. The charge amount of the capacitor 624 is defined as Q2.

The amounts Qg2 and Q2 are set so as to satisfy the following equation (5). Here, m is the number of low potential switching elements 114-116. In the present embodiment, m=3. The capacitor 623 is set to charge the capacitor 624.

$$Qg2 \times m < Q2 \qquad (5)$$

A voltage applied between the second drive unit 52 and the low potential switching elements 114 to 116 is defined as a gate voltage Vg.

The gate voltage detection unit 63 can detect the gate voltage Vg.

Also, the gate voltage detection unit 63 outputs the detected gate voltage Vg to the second drive unit 52.

The second drive unit 52 performs feedback control based on the gate voltage Vg such that the gate voltage Vg becomes a predetermined value.

The gate voltage lower limit value Vg_min and the gate voltage upper limit value Vg_max are set in the gate voltage Vg. The gate voltage lower limit value Vg_min and the gate voltage upper limit value Vg_max are set in advance, and are set by an experiment, a simulation, or the like.

The second drive unit 52 increases the gate voltage Vg when the gate voltage Vg is smaller than the gate voltage lower limit value Vg_min.

Further, when the gate voltage Vg is larger than the gate voltage upper limit value Vg_max, the second drive unit 52 reduces the gate voltage Vg.

The current flowing through the first drive unit 51 is referred to as a first drive unit current Is1.

The first drive current detection unit 64 is provided in the first drive unit 51, and can detect the first drive unit current Is1.

The first drive current detection unit 64 is, for example, a shunt resistor or a Hall element.

The first drive current detection unit 64 outputs the detected first drive unit current Is1 to the anomaly determination unit 66.

The current flowing through the second drive unit 52 is referred to as a second drive unit current Is2.

The second drive current detection unit 65 is provided in the second drive unit 52, and can detect the second drive unit current Is2.

The second drive current detection unit 65 is, for example, a shunt resistor or a Hall element.

The second drive current detection unit 65 outputs the detected second drive unit current Is2 to the anomaly determination unit 66.

The anomaly determination unit 66 determines that the first drive unit 51 is abnormal when the first drive unit current Is1 is equal to or more than a predetermined threshold Is1_th.

When the anomaly determination unit 66 determines that the first drive unit 51 is abnormal, the first drive unit 51 stops the control of the high potential switching elements 111 to 113.

Further, the anomaly determination unit 66 determines that the second drive unit 52 is abnormal when the second drive unit current Is2 is equal to or more than a predetermined threshold value Is2_th.

When the anomaly determination unit 66 determines that the second drive unit 52 is abnormal, the second drive unit 52 stops the control of the low potential switching elements 114 to 116. The predetermined thresholds Is1_th and Is2_th are set in advance, and are set by experiments, simulations, and the like.

Figure 6:
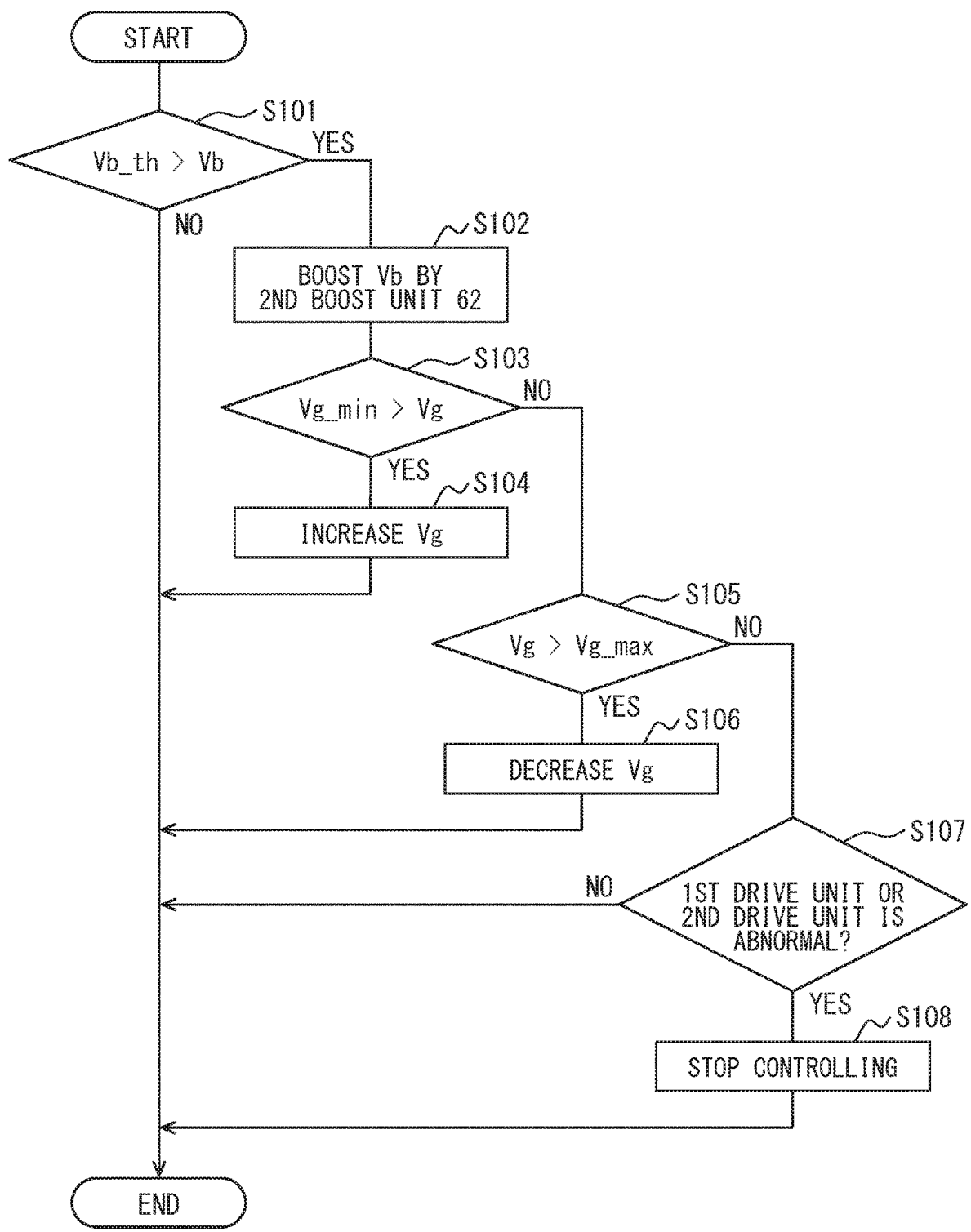
FIG. 6 is a flowchart for explaining the process of the motor control device according to an example embodiment.

The process of the motor control device 1 will be described with reference to the flowchart of FIG. 6. In the flowchart of the drawing, the symbol "S" means a step.

In step S101, the second booster 62 determines whether the power supply voltage Vb is smaller than the power supply voltage threshold Vb_th.

When the power supply voltage Vb is smaller than the power supply voltage threshold Vb_th, the process proceeds to step S102.

When the power supply voltage Vb is equal to or higher than the power supply voltage threshold Vb_th, the process ends.

In step S102, the second booster 62 boosts the power supply voltage Vb.

In step S103, the second drive unit 52 determines whether the gate voltage Vg is smaller than the gate voltage lower limit value Vg_min.

When the gate voltage Vg is smaller than the gate voltage lower limit value Vg_min, the process proceeds to step S104.

When the gate voltage Vg is equal to or higher than the gate voltage lower limit value Vg_min, the process proceeds to step S105.

In step S104, the second drive unit 52 increases the gate voltage Vg, and the process ends.

In step S105, the second drive unit 52 determines whether the gate voltage Vg is larger than the gate voltage upper limit value Vg_max.

When the gate voltage Vg is larger than the gate voltage upper limit value Vg_max, the process proceeds to step S106.

When the gate voltage Vg is equal to or less than the gate voltage upper limit value Vg_max, the process proceeds to step S107.

In step S106, the second drive unit 52 reduces the gate voltage Vg, and the process ends.

In step S107, the anomaly determination unit 66 determines whether the first drive unit 51 or the second drive unit 52 is abnormal.

When the anomaly determination unit 66 determines that the first drive unit 51 or the second drive unit 52 is abnormal, the process proceeds to step S108.

When the anomaly determination unit 66 determines that the first drive unit 51 and the second drive unit 52 are normal, the process ends.

In step S108, when the anomaly determination unit 66 determines that the first drive unit 51 is abnormal, the first drive unit 51 stops the control of the high potential switching elements 111 to 113, and the process ends.

Further, when the anomaly determination unit 66 determines that the second drive unit 52 is abnormal in step S108, the second drive unit 52 stops the control of the low potential switching elements 114-116, and the process ends.

Conventionally, as described in Patent Literature 1, an electric power steering device is known such that a boost power source is connected to a drive circuit. In recent years, low voltage drive has been required in an electric power steering device. When driving at a low voltage, the voltage between the gate and source on the low potential side is not ensured, and the switching element is in the half-on state. For this reason, the on-state resistance as a resistance value when the switching element is in the on state rapidly increases. As the on-state resistance increases, the power loss increases. For this reason, the temperature of the switching element may rise due to heat generation by the power loss, and the switching element may be damaged such as burnout.

Therefore, the motor control device of the present embodiment can avoid the failure of the switching element even when the power supply voltage is lowered.

[1] Since the second booster 62 is connected to the second drive unit 52, and the second boosted voltage Vb_B2 is supplied to the second drive unit 52, the switching elements 114-116 will not be in the half-on state. As a result, the on-state resistance is prevented from rapidly increasing, and the power loss is reduced. As a result, it is possible to avoid a failure such as burnout of the switching element.

[2] The second booster 62 boosts the power supply voltage Vb when the power supply voltage Vb is smaller than the power supply voltage threshold Vb_th. As a result, the second booster 62 can be designed according to the required voltage. The size of the second booster 62 can be minimized as compared with the case where the booster is designed to correspond to the inverter for the purpose of simply preventing a drop in an input voltage to the control device.

[3] The second drive unit 52 performs feedback control based on the gate voltage Vg. Thereby, the controllability of the low potential switching elements 114-116 by the second drive unit 52 is improved.

[4] The anomaly determination unit 66 determines that the second drive unit 52 is abnormal when the second drive unit current Is2 is equal to or higher than the predetermined threshold Is2_th, and the unit 52 stops controlling the low potential switching elements 114-116. This prevents the overcurrent to the low potential switching elements 114-116 and prevents the low potential switching elements 114-116 from being damaged.

Other Embodiments (i) The motor is not limited to a three-phase AC motor, but may be a four-phase or higher polyphase AC motor. Also, three or more sets of motors may be provided. The number of series may be three or more. Furthermore, the motor may be a generator, or may be a motor generator having both functions of a motor and a generator.

(ii) In the present embodiment, the motor and the motor control device are integrally provided. Alternatively, the motor and the motor controller may be provided separately.

(iii) The booster is not limited to the switching converter system, and may perform boosting by another system such as a linear system.

(iv) A capacitor, a power supply relay, a reverse connection protection relay or a choke coil may be provided between the battery and the inverter.

The capacitor is connected in parallel with the battery, and has a function of suppressing a normal mode noise from the battery and a function of smoothing a voltage fluctuation from the battery.

The power supply relay is provided corresponding to the winding set, provided between the battery and the inverter, and connected to the high potential line. The power supply relay is a MOSFET. The power supply relay may be an IGBT or a mechanical relay.

The power supply relay conducts or cuts off the current from the battery to the inverter.

The reverse connection protection relay is provided between the inverter and the power supply relay.

The reverse connection protection relay, like the power supply relay, is a MOSFET. Also, the reverse connection protection relay is connected such that the direction of the parasitic diode is opposite to the power supply relay.

The reverse connection protection relay interrupts the reverse current from the inverter to the power supply relay when the battery is connected in the reverse direction. Thus, the reverse connection protection relay protects the motor control device.

The choke coil has a structure in which one lead is wound around one core, and is provided between the battery and the power supply relay. The choke coil generates a magnetic flux when current flows. The choke coil functions as an inductor according to the generated magnetic flux, and suppresses noise.

(v) The first booster 61 and the second booster 62 may be set such that the first boosted voltage Vb_B1 and the second boosted voltage Vb_B2 are three or more times larger than the power supply voltage Vb. In this case, in the first booster and the second booster, the number of diodes, the number of capacitors and the number of witching elements are increased according to the multiple number of the power supply voltage Vb.

Figure 7:
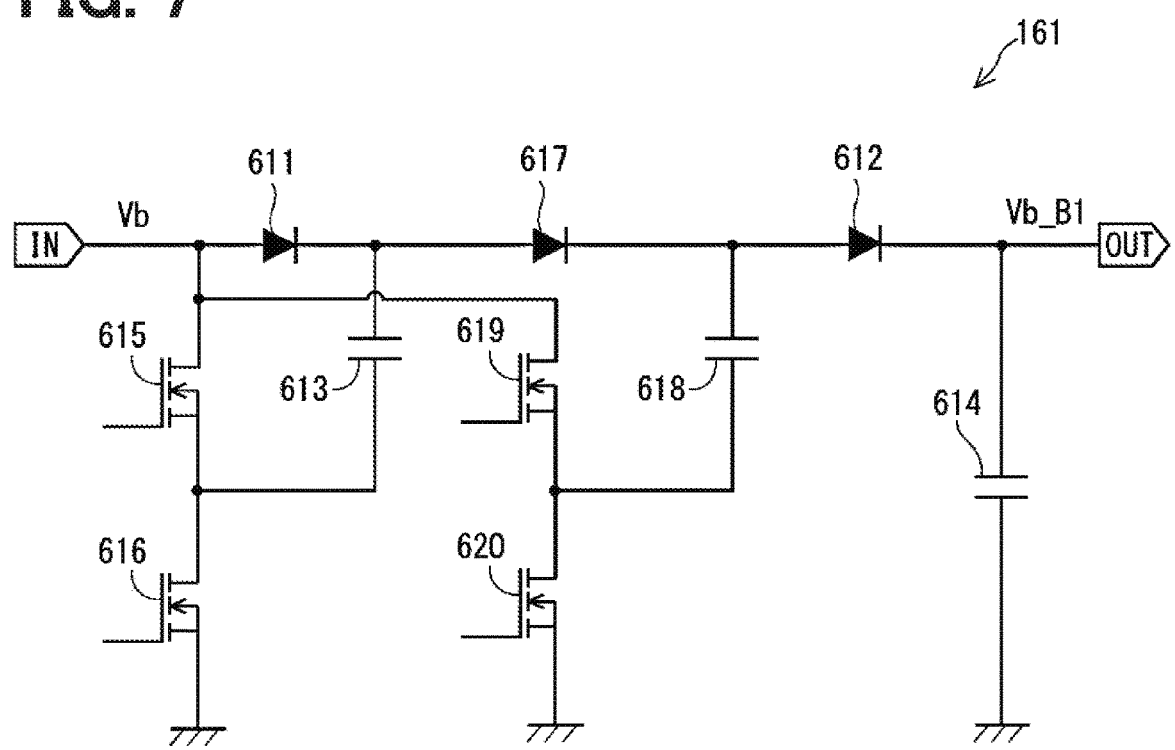
FIG. 7 is a circuit diagram for explaining a first booster of the motor control device according to another example embodiment.

As shown in FIG. 7, the first booster 161 further includes a diode 617, a capacitor 618, and switching elements 619 and 620 disposed between the capacitor 613 and the capacitor 614 such that the first boosted voltage Vb_B1 is three times larger than the power supply voltage Vb.

As in the embodiment, the voltage related to the capacitor 613 is defined as Vc. Similar to one embodiment, Vc is expressed as in equation (1). The voltage Vc is charged in the capacitor 613.

The voltage associated with the capacitor 618 is defined as Vc_ad.

After the capacitor 613 is charged, when the switching element 615 turns on, the switching element 616 turns off, the switching element 619 turns off, and the switching element 620 turns on, the voltage Vc_ad is expressed by the following equation (6). The voltage Vc_ad is changed in the capacitor 618.

$$Vc\_ad = Vb + Vc - Vf = 2Vb - 2Vf \quad (6)$$

After the capacitor 618 is charged, when the switching element 619 turns on and the switching element 620 turns off, the first boosted voltage Vb_B1 is expressed by the following equation (7). Thus, the switching elements 615, 616, 619, 620 are driven to boost. For example, by driving the switching element 615 and the switching element 620 synchronously and driving the switching element 616 and the switching element 619 synchronously, the boosting can be performed in a short time. Charges of capacitor 614 and capacitor 624 are adjusted in accordance with the multiple number of the power supply voltage Vb.

$$Vb\_B1 = Vb + Vc\_ad - Vf = 3Vb - 3Vf \tag{7}$$

Figure 8:
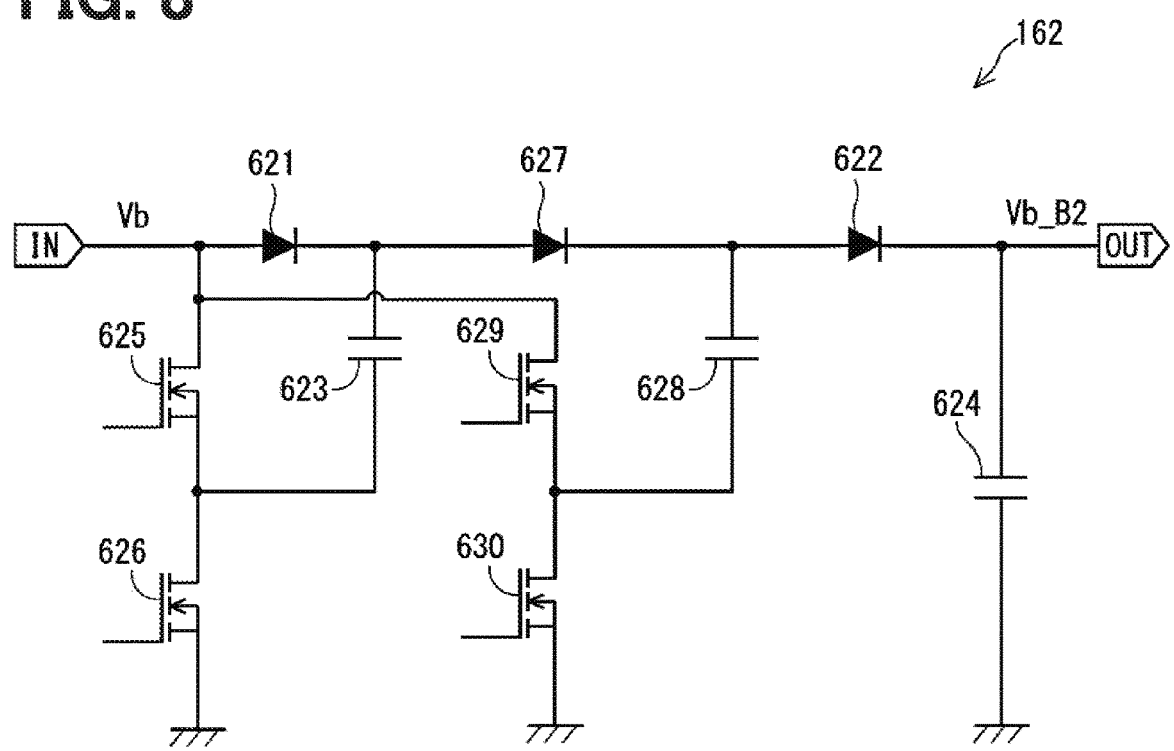
FIG. 8 is a circuit diagram for explaining a second booster of the motor control device according to another example embodiment.

As shown in FIG. 8, the second booster 162 further includes a diode 627, a capacitor 628, and switching elements 629 and 630 disposed between the capacitor 623 and the capacitor 624 such that the second boosted voltage Vb_B2 is three times larger than the power supply voltage Vb.

The second booster 162 is driven in the same manner as the first booster 161 described above. The second boosted voltage Vb_B2 is tripled the power supply voltage Vb.

(Vi) A voltage converter may be provided between the battery and the control unit.

The present disclosure is not limited to the above embodiments but various modifications may be made within the scope of the present disclosure without departing from the spirit of the disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A control device for controlling a motor that is rotated by electric power, the control device comprising:
    an inverter having a plurality of high potential switching elements connected to a high potential line and a plurality of low potential switching elements connected to a low potential line and supplying the electric power from a power supply to the motor;
    a first drive unit controlling an operation of the high potential switching elements;
    a first booster connected to the first drive unit, boosting a voltage of the power supply, and outputting a boosted voltage to the first drive unit;
    a second drive unit controlling an operation of the low potential switching elements;
    a second booster connected to the second drive unit, boosting the voltage of the power supply, and outputting an other boosted voltage to the second drive unit; and
    a power supply voltage detection unit detecting the voltage of the power supply,
    wherein:
    the second booster boosts the voltage of the power supply when the voltage of the power supply is smaller than a power supply voltage threshold;
    the second booster does not boost the voltage of the power supply when the voltage of the power supply is greater than the power supply voltage threshold; and
    the first booster always boosts the voltage of the power supply without depending on the voltage of the power supply.

2. The control device according to claim 1, wherein:
    the boosted voltage of the first booster is larger than the other boosted voltage of the second booster.

3. The control device according to claim 1, further comprising:
    a gate voltage detection unit detecting a gate voltage that is applied between the second drive unit and the low potential switching elements, wherein:
    the second drive unit performs a feedback control based on the gate voltage.

4. The control device according to claim 3, wherein:
    the second drive unit increases the gate voltage when the gate voltage is smaller than a lower limit value; and
    the second drive unit decreases the gate voltage when the gate voltage is larger than an upper limit value.

5. The control device according to claim 1, further comprising:
    an anomaly determination unit that determines an anomaly of the first drive unit or the second drive unit, wherein:
    when the anomaly determination unit determines that the first drive unit is abnormal, the first drive unit stops controlling the high potential switching elements; and
    when the anomaly determination unit determines that the second drive unit is abnormal, the second drive unit stops controlling the low potential switching elements.

6. The control device according to claim 1, wherein:
    the first booster and the second booster are integrally arranged on one substrate.

7. The control device according to claim 1, wherein:
    temperature of the high potential switching elements or the low potential switching elements is defined as an element temperature,
    the control device further comprising:
    a temperature estimation unit estimating the element temperature; and
    a motor current limitation unit limiting current flowing in the motor based on the element temperature.

8. The control device according to claim 1, wherein:
    the second drive unit increases a gate voltage between the second drive unit and the low potential switching elements when the gate voltage is smaller than a lower limit value after the second booster boosts the voltage of the power supply; and
    the second drive unit decreases the gate voltage when the gate voltage is larger than an upper limit value after the second booster boosts the voltage of the power supply.

9. An electric power steering device comprising:
    a motor that outputs an assist torque for assisting a steering operation of a driver; and
    a control device, wherein:
    the control device controls the motor that is rotated by electric power,
    the control device includes:
    an inverter having a plurality of high potential switching elements connected to a high potential line and a plurality of low potential switching elements connected to a low potential line and supplying the electric power from a power supply to the motor;
    a first drive unit controlling an operation of the high potential switching elements;
    a first booster connected to the first drive unit, boosting a voltage of the power supply, and outputting a boosted voltage to the first drive unit;
    a second drive unit controlling an operation of the low potential switching elements;

a second booster connected to the second drive unit, boosting the voltage of the power supply, and outputting an other boosted voltage to the second drive unit; and a power supply voltage detection unit detecting the voltage of the power supply;

the second booster boosts the voltage of the power supply when the voltage of the power supply is smaller than a power supply voltage threshold, wherein the second booster does not boost the voltage of the power supply when the voltage of the power supply is greater than the power supply voltage threshold; and the first booster always boosts the voltage of the power supply without depending on the voltage of the power supply.

\* \* \* \* \*